H. W. CATLIN.
Hold-Back.
No. 43,570. Patented July 19, 1864.
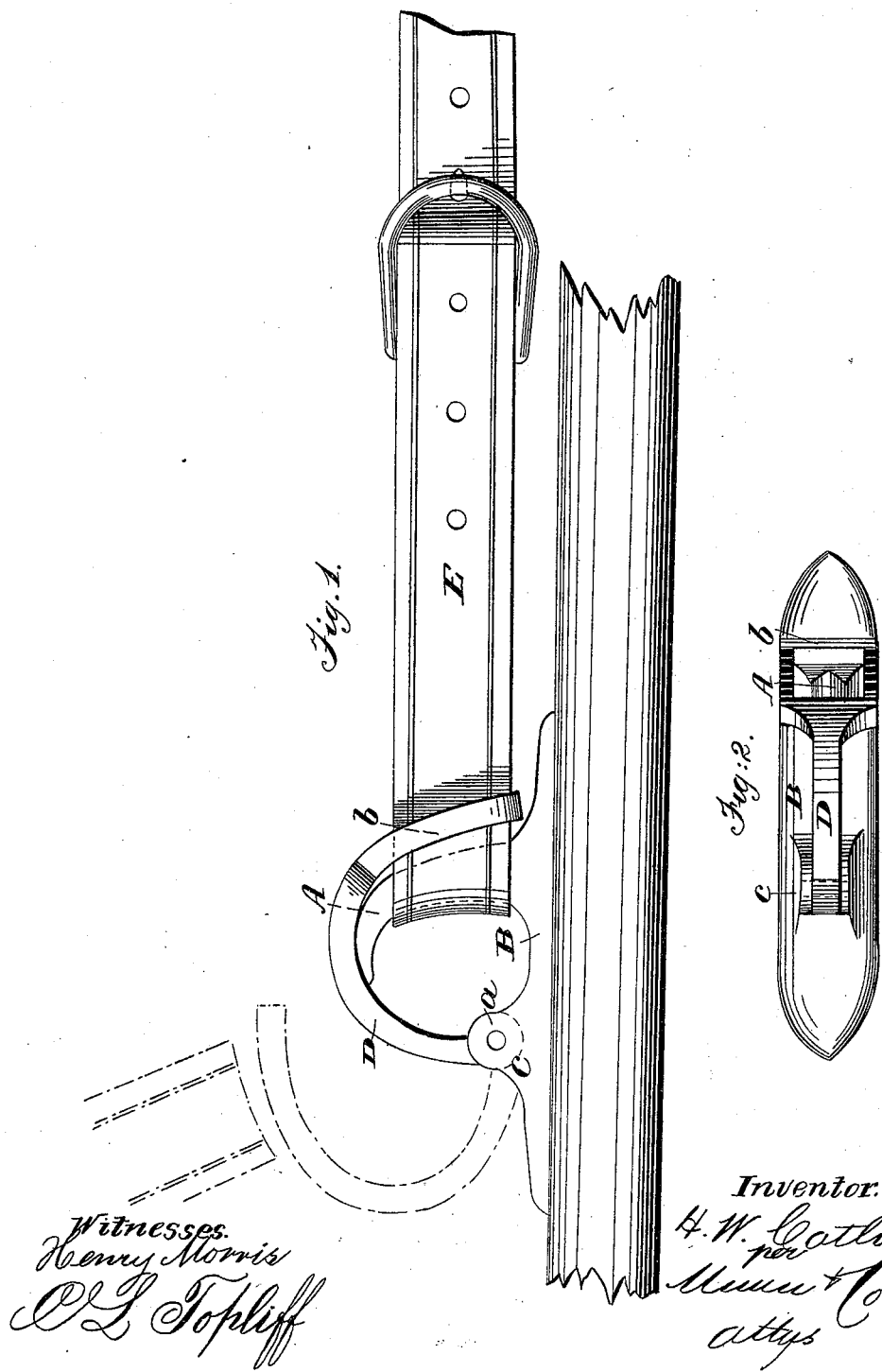

UNITED STATES PATENT OFFICE.

H. W. CATLIN, OF BURLINGTON, VERMONT.

IMPROVEMENT IN HOLDBACKS AND TRACE-FASTENINGS FOR VEHICLES.

Specification forming part of Letters Patent No. 43,570, dated July 19, 1864.

*To all whom it may concern:*

Be it known that I, H. W. CATLIN, of Burlington, in the county of Chittenden and State of Vermont, have invented a new and Improved Holdback and Trace-Fastening for Wheel-Vehicles; and I do hereby declare that the following is a full, clear, and exact description thereof, which will enable others skilled in the art to make and use the same, reference being had to the accompanying drawings, forming part of this specification, in which—

Figure 1 represents a side view of my invention; Fig. 2, a plan or top view of the same.

Similar letters of reference indicate like parts.

This invention relates to a new and improved holdback and trace-fastening for wheel-vehicles.

The object of the invention is to obtain a device for the purpose specified which will admit of the holdback-strap being fitted to and disconnected from without the necessity of unbuckling the strap, and when used as a trace-fastening will, in the event of the trace at one side or the end of the whiffletree becoming casually detached, admit of the trace at the opposite end disengaging itself.

The invention consists in the employment or use of a fixed hook, and pivoted or swinging eye, as hereinafter fully set forth.

A represents a hook, over which the holdback strap or trace is fitted or placed. This hook projects from a base-plate, B, which may be cast with the hook in the same piece; and C is a lug or ear, in which one end of a curved or semicircular bar, D, is secured by a pivot, $a$. The opposite end of the bar D is made in the form of an eye, $b$, and the bar D is curved in such a manner that when the bar is pressed down towards the base-plate B the eye $b$ will be in front of the hook A, as shown clearly in Fig. 1. The base-plate B is secured to the shafts, one to each, when the device is used as a holdback, and secured to the whiffletree, one to each end, when it is used as a trace-fastening. The holdback strap or trace E is passed through the eye $b$, and fitted on the hook A, as shown clearly in Fig. 1.

From the above description it will be seen that in order to detach the strap or trace from the hook all that is required is simply to raise the bar D, as shown in red in Fig. 1, and the eye $b$ will draw the strap or trace off the hook A.

When the device is applied to a whiffletree, in case one of the traces becomes casually detached, the other will in consequence of the swinging around of the whiffletree disengage itself.

I claim as new and desire to secure by Letters Patent—

The fixed or rigid hook A, in combination with the swinging or pivoted eye $b$, arranged to operate in the manner substantially as and for the purpose set forth.

H. W. CATLIN.

Witnesses:
J. P. HALL,
M. M. LIVINGSTON.